United States Patent [19]

Bird

[11] Patent Number: 4,601,419
[45] Date of Patent: Jul. 22, 1986

[54] AUTOMOBILE ROOF-MOUNTED CARRIER

[76] Inventor: Henry B. Bird, Baptist Church Rd., Yorktown Heights, N.Y. 10598

[21] Appl. No.: 760,329

[22] Filed: Jul. 29, 1985

[51] Int. Cl.⁴ .................................................. B60R 9/04
[52] U.S. Cl. ..................................... 224/318; 224/327
[58] Field of Search ............... 224/309, 314, 318, 327; 108/90, 901; 248/503

[56] References Cited

U.S. PATENT DOCUMENTS 3,174,665  3/1965  Williams ............................. 224/327
4,226,354 10/1980  Allen .................................. 224/318

FOREIGN PATENT DOCUMENTS 302350 12/1954 Switzerland ........................ 224/327

Primary Examiner—Stephen Marcus
Assistant Examiner—David Voorhees
Attorney, Agent, or Firm—Darby & Darby

[57] ABSTRACT

A vehicle carrier is formed from a flexible mat with suction cups along its bottom surface and raised ridges along the sides of its upper surface. A plurality of slots are provided in these raised ridges. Rigid retaining bars located along the raised ridges are connected to tie straps which pass through the slots and surround the retaining bars. These tie straps then extend back through the slot and connect to the vehicle. Additional tie straps connect to the rigid retaining bar and are secured about a load carried on the mat. Because of the flexible material the mat is made of, it can be rolled into a cylindrical shape and stored in the vehicle trunk along with the retaining bars and tie straps.

12 Claims, 6 Drawing Figures

AUTOMOBILE ROOF-MOUNTED CARRIER

BACKGROUND OF THE INVENTION

This invention relates to roof carriers for vehicles and, more particularly, to an automobile roof carrier which can be easily installed and easily stored within the automobile.

Frequently, personal automobiles are used for carrying various loads which are too bulky to fit within the passenger compartment of the automobile or its trunk. This is due in part to the increasingly small size of the average family car. Because these carriers are often unsightly in appearance and are used infrequently, there is a need to remove these carriers when not in use. However, carriers typically found in the prior art are not simple to install and are difficult to remove. Further, once the carrier is removed, there is the problem of storing it in some convenient location, generally a garage, where it tends to use up useful space.

With a prior art roof carrier stored in a garage or some other place about the home, the user must anticipate the purchase of an item which requires the carrier to transport it, and must install the carrier on the vehicle prior thereto. If the user should forget to do this, or if the user makes an unplanned purchase, the carrier is useless if not with the car and, at the very least, will require the user to make a special trip to transport the item. Thus, there is perceived the need for an occasional light duty automobile roof carrier which can be installed and removed easily, and can be stored in the trunk of the car.

SUMMARY OF THE INVENTION

The present invention is directed to providing an automobile roof carrier which is easy to install and which can be rolled up into a size convenient for storing within the average car. Despite its light weight and ease of storage, the carrier is designed to accommodate and support relatively substantial loads, while protecting the vehicle from damage.

In an illustrative embodiment of the invention, the roof carrier for a vehicle includes a flexible mat which is preferably made of rubber or plastics material. The lower surface of the mat is provided with a plurality of suction cups which tend to stabilize the mat on the vehicle. At least the longitudinal sides of the mat are provided with raised ridges which tend to stabilize the load on the mat. The raised ridges also define a plurality of slots passing through the ridges. On the interior of the raised ridges, adjacent to the slots, there are positioned rigid retaining bars which tend to stiffen the flexible mat for adequate support of the load. A first set of tie straps is arranged about the rigid bars on both sides of the mat and extend through the slots in the raised ridges to hooks which are attached to a portion of the vehicle, for example, the roof gutters. Because of the material that the mat is made of and the narrow dimensions of the slot, the connection of the first tie straps to the rigid bars can be accomplished purely through the use of friction. A second set of tie straps also passes about the rigid bars and through the slots. However, these second tie straps pass over the load and are attached to each other by connection pieces.

In a preferred embodiment of the invention, both the hooks and the connection pieces have pairs of slots which allow for frictional connection of the tie straps to these elements. Since the mat is attached to the vehicle by suction cups and tie straps using frictional engagement, the vehicle carrier is relatively simple to install or remove. Further, since the rigid bars are not unitary with the mat, they can be removed and the mat rolled into a cylindrical shape for storage in the vehicle. Further, the rubber or plastics material of the mat protects the vehicle surface from scratches or other damage which the load might cause.

BRIEF DESCRIPTION OF THE DRAWINGS

The foregoing and other features of the present invention will be more readily apparent from the following detailed description and drawings of illustrative embodiments of the invention in which.

DESCRIPTION OF ILLUSTRATIVE EMBODIMENTS

Figure 1:
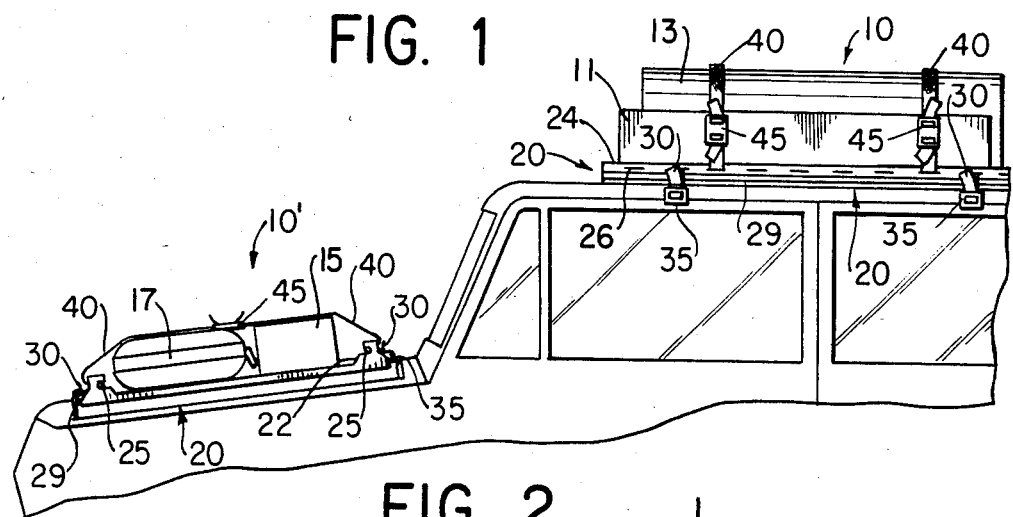
FIG. 1 is a partial side view of an automobile with the carriers of the present invention mounted to its roof and rear trunk.

In FIG. 1 there is shown a vehicle, i.e. an automobile, carrying a load 10 on its roof and a load 10' on its trunk. These loads include a relatively long cylindrical item 11, a shorter rectangular item 13, a short nearly square item 15 and an oval (suitcase-shaped) item 17. The items which form the loads are supported on the roof and trunk of the vehicle via a carrier formed according to the present invention.

Figure 2:
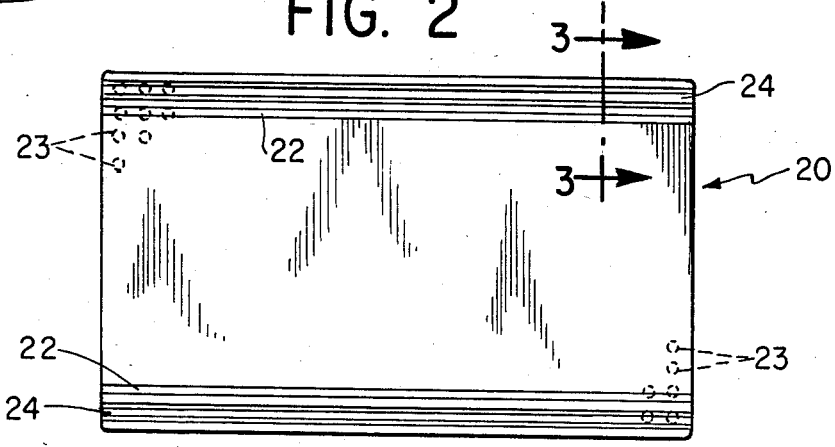
FIG. 2 is a top view of the mat forming a part of the carrier.
Figure 3:
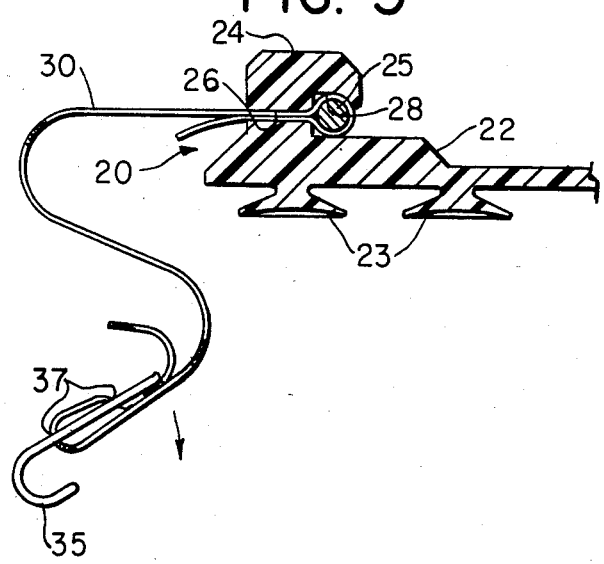
FIG. 3 is an enlarged partial sectional view of the raised ridge of the mat along lines 3—3 of FIG. 2, and side view of a tie strap and hook.

As best seen in FIG. 2, the carrier includes a mat 20. The upper surface of the mat contains a recess area 22 which provides lateral support for the load (FIG. 3). In addition, raised ridges 24 extend along both longitudinal sides of the mat. These ridges define longitudinally spaced apart slots 26 which are on each side of the mat. These slots can be provided in any convenient number. In addition, as best shown in FIG. 3, the raised ridges 24 on both sides of the mat 20 have a longitudinal recessed area 28 which is in communication with the slots 26.

Located within the recessed areas 28 are rigid retaining bars 25 which are not directly connected to the mat 20. At least one of these retaining bars is located along each side of the mat. One continuous bar is shown in the drawings, but the retaining bar could be in the form of two or more sections which may or may not be connected to each other. If desireable, stiffening bars can also be attached to the ends of the mat (not shown). These bars, as well as the relative thickness of ridges 24 and the upper surface of the mat outside of the recess 22, give the mat a relative rigidity, at least along its sides.

The bottom of mat 20 contains a plurality of suction cups 23 which can be arranged in any uniform or random pattern. The number of suction cups is sufficient to prevent sliding of the mat on the surface of the vehicle.

The mat is additionally secured to the vehicle by means of tie straps 30. One end of tie strap 30 is secured to retainer bar 25 and the other end is secured to a hook 35 as best shown in FIG. 3. The hook may conveniently be attached to the roof gutter of the vehicle and the strap tightened to provide a secure connection of the mat to the roof. The retainer bar 25 not only stiffens the outer walls of the mat, it spreads the force applied to the mat through the straps 30 along the raised ridges 24 and keeps it from being concentrated at any one point.

Figure 4:
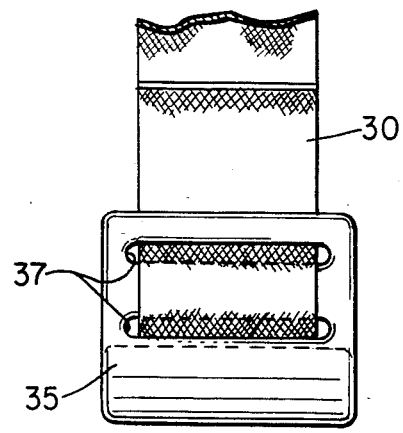
FIG. 4 is a front view of the hook according to the present invention.

FIG. 3 illustrates the manner in which strap 30 is preferably connected to both retainer bar 25 and hook 35. In particular, the first end of strap 30 passes through slot 26, wraps around bar 25 and passes back out through the same slot. Because the mat is made of a rubberized material or at least the interior surfaces of slots 26 are made of a similar high friction material, the strap 30 will not pull through the slot and from about bar 25 when tension is applied to it. Similarly, hook 35 is provided with two slots 37 (FIG. 4) and the strap 30 is passed from one side of the hook through the lower slot and then back through the upper slot (FIG. 3). By tilting the hook it is easy to move the tie strap 30 through the slots of hook 35 to tighten the tie strap. However, as the tension is increased in strap 30, a significant frictional connection is developed so that the tie strap 30 will not come loose from hook 35. Because of this arrangement and the suction caps 23, it is a simple matter to install the mat on the vehicle.

Figure 5:
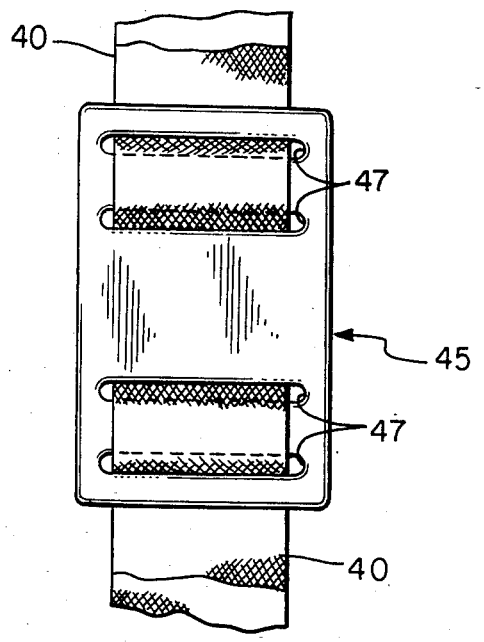
FIG. 5 is a front view of a connection piece and its attachment to a tie strap according to the present invention.

The same slots, or at least some of them, which are used to position tie straps 30 and to secure the strap to the retaining bar, can also used to secure the load to the carrier via straps 40. These straps 40 also pass through a vacant slot, wrap about retaining bar 25 and pass back out through the same slot. However, instead of extending downwardly to attach to the vehicle, they are passed upwardly over the load. Similarly arranged straps from both sides of the mat meet over the load and are connected together by a connection piece such as that shown in FIG. 5. The connection piece 45 includes two pairs of slots 47 at either end thereof. The tie straps 40 from opposite sides of the mat pass through the slots in the same manner as strap 30 passes through the slots in hook 35. Thus, tensioning of straps 40 about the load is relatively easy and the connection is maintained by frictional forces. Also, since a number of slots are used along the sides of the mat, the carrier can accommodate a wide variety of vehicles and packages or loads.

Figure 6:
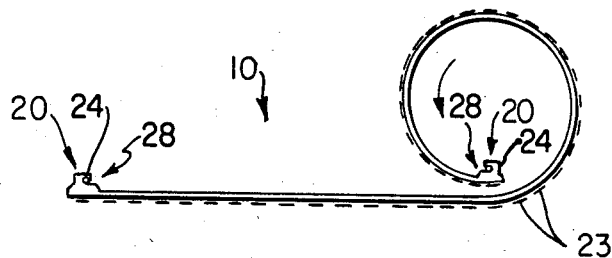
FIG. 6 is an illustration of the manner in which the carrier of the present invention can be rolled into a cylinder for storage in the vehicle.

As shown in FIG. 6, the center portion of the mat is relatively thin and flexible, but still has sufficient thickness to prevent the surface of the vehicle from being damaged by the load 10 stored thereon. Nevertheless, this flexibility allows the mat portion to rolled into a cylindrical shape for easy storage in the trunk of a vehicle. When this is done, the rigid retaining bars can remain in position within the recesses 28 of the raised ridges 24, and straps 30 and 40 can be looped into the interior of the rolled mat. If desirable, a belt or other fastener can be used to keep the mat in a rolled up position for storage. Thus, the carrier unit with all of its component parts remains in the vehicle, ready for use on short notice. Further, the simplicity of its attachment to and detachment from the vehicle promotes its use on more occasions.

As shown in FIG. 1, the carrier can also be attached to the trunk lid of a car using the hooks which previously attached to the roof gutter. In addition, more than one of the mats can be used, with one positioned on the roof and the other positioned on the trunk lid. An optional fabric or canvas bag (not shown) can be used with the carrier to hold and protect small items or to protect larger items from wind and other weather conditions. In addition, the rolled-up mat itself can be stored in the canvas bag.

The tie straps 30 and 40 are preferably made of standard nylon woven material with sufficient surface friction to grip the hook, connection piece and retainer bar without slippage. The retainer bar can be made of rigid plastics material so that it is rain resistant. Similarly, the hook and connection piece can be made of a plastics material or a rubber coated metal material.

While the invention has been particularly shown and described with reference to preferred embodiments thereof. It will be understood by those skilled in the art various changes in form and details may be made therein without departing from the spirit and scope of the invention.

I claim:

1. A vehicle carrier for supporting a load on a vehicle comprising:
   a flexible mat with upper and lower surfaces, raised ridges being provided at least along the longitudinal sides of the upper surface of said mat, and adhering means being provided on its lower surface, the load being applied to the upper surface, the raised ridges defining a plurality of slots along the longitudinal sides of said mat, said slots extending completely through the raised ridges;
   rigid retaining bars positioned along interior longitudinal portions of the raised ridges; and
   at least one first tie strap on each opposite longitudinal side of said mat, one end of each of said first tie straps passing through one of the slots in opposite raised ridges and being connected to respective retaining bars and the other ends of said straps being adapted to be fastened to a portion of the vehicle.

2. A vehicle carrier as claimed in claim 1, wherein said mat is sufficiently flexible to allow it to be manually rolled up into a generally cylindrical shape for storage.

3. A vehicle carrier as claimed in claim 2, wherein the raised ridges have a substantial thickness so as to reinforce said mat at the location of said retaining bars, a recess being provided in said raised ridges on the interior side to receive said retaining bars.

4. A vehicle carrier as claimed in claim 1, wherein the upper surface of said mat has a longitudinal depressed region between the raised ridges so as to secure the load against lateral motion.

5. A vehicle carrier as claimed in claim 1, wherein said adhering means are a plurality of suction cups.

6. A vehicle carrier as claimed in claim 1, wherein the other end of each first tie strap includes a hook fastened to a roof gutter of the vehicle.

7. A vehicle carrier as claimed in claim 1, wherein other end of each first tie strap includes a hook fastened to a truck lid of the vehicle.

8. A vehicle carrier as claimed in claim 1, further comprising:
   at least one second tie strap on each opposite longitudinal side of said mat, one end of each of said second tie straps passing through a vacant slot in the opposite raised ridges and being attached to respective retaining bars, the other ends of said second tie straps extending above the carrier load; and at least one connection piece connecting said second tie straps from opposite sides of said mat above said load.

9. A vehicle carrier as claimed in claim 8, wherein said connection piece is a plate having two slots toward one end and two slots toward the other end, said second tie straps being looped about the positions of the plate between the two slots of each respective set and forming a frictional connection between opposite second tie straps and the plate.

10. A vehicle carrier as claimed in claim 8, wherein the attachment of said first and second tie straps to the retaining bars is achieved by passing the tie straps about the retaining bar and returning the tie straps back through the same slot, the surface area of the ridges defining the slots having a high coefficient of friction and the slot being of such a size that the first tie strap does not slip significantly after tension is applied to it by connection of the first tie straps to the vehicle.

11. A vehicle carrier as claimed in claim 9, wherein said first tie straps have hooks at their one end for attachment to the vehicle, a pair of slots being provided toward one end of said hook, said first tie straps being looped about the portion of the hook between the two slots and forming a frictional connection therewith.

12. A vehicle carrier for supporting a load on a vehicle comprising:
  a flexible mat with upper and lower surfaces, and longitudinal sides, the load being applied to the upper surface;
  adhering means provided on the lower surface of said mat for securing said mat to a surface of the vehicle;
  raised ridges provided at least along the longitudinal sides of the upper surface of said mat for reinforcing it, said raised ridges defining a plurality of slots along the longitudinal sides of said mat which pass completely through said raised ridges;
  rigid retaining bars positioned along interior longitudinal portions of the raised ridges adjacent the slots;
  at least one first tie strap on each opposite longitudinal side of said mat, one end of each of said first tie straps passing through one of the slots to the interior portion of the raised ridge, passing about said retaining bar and passing back through the same slot, the surface area defining the slot having a size and coefficient of friction such that the connection between the first strap and said retaining bar is maintained under tension;
  at least one hook for attachment to each of the other ends of said first tie straps and to a portion of the vehicle, said hook having two slots with the other end of the first tie straps being looped through the slots and being pressed into frictional engagement with itself such that the attached to said hook is maintained under tension;
  at least one second tie strap on each opposite longitudinal side of said mat, one end of each of said second tie straps passing through one of the slots not utilized by said first tie straps to the interior portion of the raised ridge, passing about said retaining bar and passing back through the slot so as to connect the one ends of said second tie straps to said retaining bar in the same manner said first tie straps connect thereto; and
  at least one connection piece for connecting the other ends of said second tie straps about the load, said connection piece having pairs of slots at opposite ends thereof with the other ends of the second tie straps looped through the pairs of slots so as to connect the other ends of said second tie straps to said connection piece in the same manner said hook is connected to the other ends of said first tie straps.

* * * * *